(12) United States Patent
Wei et al.

(10) Patent No.: US 9,756,442 B2
(45) Date of Patent: *Sep. 5, 2017

(54) METHOD FOR MAKING THERMOACOUSTIC DEVICE ARRAY

(71) Applicants: Tsinghua University, Beijing (CN); HON HAI PRECISION INDUSTRY CO., LTD., New Taipei (TW)

(72) Inventors: Yang Wei, Beijing (CN); Xiao-Yang Lin, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 888 days.

This patent is subject to a terminal disclaimer.

(21) Appl. No.: 13/931,508

(22) Filed: Jun. 28, 2013

(65) Prior Publication Data
US 2014/0137398 A1    May 22, 2014

(30) Foreign Application Priority Data
Nov. 20, 2012   (CN) .......................... 2012 1 0471232

(51) Int. Cl.
*H04R 31/00*   (2006.01)
*B82Y 15/00*   (2011.01)
*H04R 23/00*   (2006.01)

(52) U.S. Cl.
CPC ............ *H04R 31/003* (2013.01); *B82Y 15/00* (2013.01); *H04R 23/002* (2013.01); *Y10T 29/49005* (2015.01)

(58) Field of Classification Search
CPC ...... H04R 31/00; H04R 23/002; B82Y 15/00; Y10T 29/49005; Y10S 977/932; Y10S 977/742
(Continued)

(56) References Cited

U.S. PATENT DOCUMENTS 7,726,190 B2   6/2010   Matsumoto et al.
7,876,912 B2   1/2011   Liu et al.
(Continued)

FOREIGN PATENT DOCUMENTS

CN    101133320    2/2008
CN    101771920    7/2010
(Continued)

*Primary Examiner* — Peter DungBa Vo
*Assistant Examiner* — Azm Parvez
(74) *Attorney, Agent, or Firm* — Steven Reiss

(57) ABSTRACT

A method for making a thermoacoustic device array includes the following step. A substrate having a surface is provided. The surface defines a grid having a number of cells. A number of recesses are defined on each of the cells. The recesses are parallel with and spaced from each other. A first electrode and a second electrode are formed on each of the cells. The first electrode is spaced from the second electrode, and one of the recesses is located between the first electrode and the second electrode. A sound wave generator is applied on the substrate and electrically connected to the first electrode and the second electrode. The sound wave generator is suspended over the recesses. The sound wave generator is separated according to the cells.

14 Claims, 14 Drawing Sheets

(58) Field of Classification Search
USPC .............. 29/594, 592.1; 977/742, 932, 700
See application file for complete search history.

(56) References Cited

U.S. PATENT DOCUMENTS

| | | |
|---|---|---|
| 8,019,100 B2 | 9/2011 | Jiang et al. |
| 8,059,841 B2 | 11/2011 | Jiang et al. |
| 8,208,661 B2 | 6/2012 | Jiang et al. |
| 8,300,855 B2 | 10/2012 | Liu et al. |
| 8,379,885 B2 | 2/2013 | Liu |
| 8,494,187 B2 | 7/2013 | Jiang et al. |
| 8,553,912 B2 | 10/2013 | Wang et al. |
| 2005/0201575 A1 | 9/2005 | Koshida et al. |
| 2006/0043576 A1 | 3/2006 | Lee |
| 2006/0233388 A1 | 10/2006 | Liow et al. |
| 2008/0170727 A1 | 7/2008 | Bachman et al. |
| 2008/0190206 A1 | 8/2008 | Matsumoto et al. |
| 2008/0286938 A1* | 11/2008 | Pu .................... H01L 21/78 438/458 |
| 2010/0067714 A1 | 3/2010 | Cheng |
| 2010/0086166 A1 | 4/2010 | Jiang et al. |
| 2010/0166232 A1* | 7/2010 | Liu .................... H04R 1/028 381/164 |
| 2010/0203929 A1 | 8/2010 | Skagmo et al. |
| 2010/0260357 A1 | 10/2010 | Liu et al. |
| 2010/0311002 A1 | 12/2010 | Jiang et al. |
| 2011/0033069 A1 | 2/2011 | Liu et al. |
| 2011/0051961 A1 | 3/2011 | Jiang et al. |
| 2011/0054659 A1 | 3/2011 | Carlson et al. |
| 2011/0147898 A1 | 6/2011 | Hosier et al. |
| 2012/0250905 A1 | 10/2012 | Jiang et al. |
| 2012/0250907 A1 | 10/2012 | Jiang et al. |
| 2012/0250908 A1 | 10/2012 | Jiang et al. |
| 2013/0129119 A1 | 5/2013 | Miyatake et al. |
| 2013/0216074 A1 | 8/2013 | Kon |
| 2014/0137397 A1* | 5/2014 | Wei .................... H04R 31/00 29/594 |

FOREIGN PATENT DOCUMENTS

| | | |
|---|---|---|
| CN | 101783995 | 7/2010 |
| CN | 101820571 | 9/2010 |
| CN | 102157447 | 8/2011 |
| CN | 102307715 | 1/2012 |
| JP | 11-300274 | 11/1999 |
| JP | 2005-57479 | 3/2005 |
| JP | 2005-057495 | 3/2005 |
| JP | 3808493 | 5/2006 |
| JP | 2008-167252 | 7/2008 |
| JP | 2009-141880 | 6/2009 |
| JP | 2010-74831 | 4/2010 |
| JP | 2010-93804 | 4/2010 |
| JP | 2010-288270 | 12/2010 |
| JP | 2011-41269 | 2/2011 |
| JP | 2012-039272 | 2/2012 |
| JP | 2012-39272 | 2/2012 |
| JP | 2012-94942 | 5/2012 |
| JP | 2012-209923 | 10/2012 |
| TW | 209093 | 7/1993 |
| TW | I246735 | 1/2006 |
| TW | M299999 | 10/2006 |
| TW | 200644701 | 12/2006 |
| TW | I273715 | 2/2007 |
| TW | 200725861 | 7/2007 |
| TW | 200743677 | 12/2007 |
| TW | 201002097 | 1/2010 |
| TW | 201018256 | 5/2010 |
| TW | 201029481 | 8/2010 |
| TW | 201043763 | 12/2010 |
| TW | 201118938 | 6/2011 |
| TW | 201125373 | 7/2011 |
| TW | 201143474 | 12/2011 |
| TW | I356396 | 1/2012 |
| TW | 201240480 | 10/2012 |
| TW | 201240486 | 10/2012 |

\* cited by examiner

METHOD FOR MAKING THERMOACOUSTIC DEVICE ARRAY

RELATED APPLICATIONS

This application claims all benefits accruing under 35 U.S.C. §119 from China Patent Application No. 201210471232.6, filed on Nov. 20, 2012 in the China Intellectual Property Office, the contents of which are hereby incorporated by reference. This application is related to commonly-assigned applications entitled, "THERMOACOUSTICS DEVICE ARRAY", U.S. patent application Ser. No. 13/931,491, filed Jun. 28, 2013, the contents of the above commonly-assigned applications are hereby incorporated by reference.

BACKGROUND

1. Technical Field

The present disclosure relates to thermoacoustic device arrays and method for making the same.

2. Description of Related Art

An acoustic device generally includes an electrical signal output device and a loudspeaker. The electrical signal output device inputs electrical signals into the loudspeaker. The loudspeaker receives the electrical signals and then transforms them into sounds.

There are different types of loudspeakers that can be categorized according by their working principles, such as electro-dynamic loudspeakers, electromagnetic loudspeakers, electrostatic loudspeakers and piezoelectric loudspeakers.

Thermoacoustic effect is a conversion of heat to acoustic signals. The thermoacoustic effect is distinct from the mechanism of the conventional loudspeaker, which the pressure waves are created by the mechanical movement of the diaphragm. When signals are inputted into a sound wave generator, heating is produced in the sound wave generator according to the variations of the signal and/or signal strength. Heat is propagated into surrounding medium. The heating of the medium causes thermal expansion and produces pressure waves in the surrounding medium, resulting in sound wave generation. Such an acoustic effect induced by temperature waves is commonly called "the thermoacoustic effect".

Carbon nanotubes (CNT) are a novel carbonaceous material having extremely small size and extremely large specific surface area. Carbon nanotubes have received a great deal of interest since the early 1990s, and have interesting and potentially useful electrical and mechanical properties, and have been widely used in a plurality of fields. The carbon nanotube film used in the thermoacoustic device has a large specific surface area, and extremely small heat capacity per unit area that make the sound wave generator emit sound audible to humans. However, the carbon nanotube film used in the thermoacoustic device has a small thickness and a large area, and is likely to be damaged by the external forces applied thereon.

What is needed, therefore, is to provide a method for making thermoacoustic device for solving the problem discussed above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
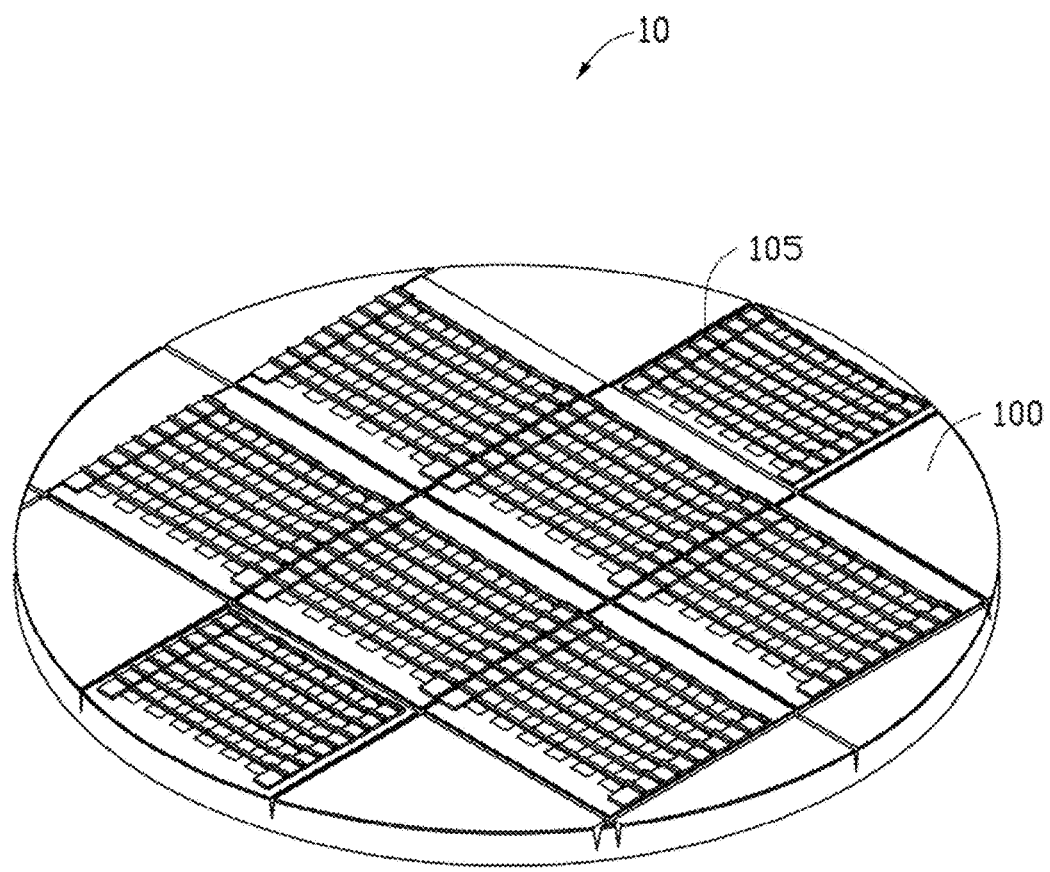
FIG. 1 is a schematic view of one embodiment of a thermoacoustic device array.
Figure 2:
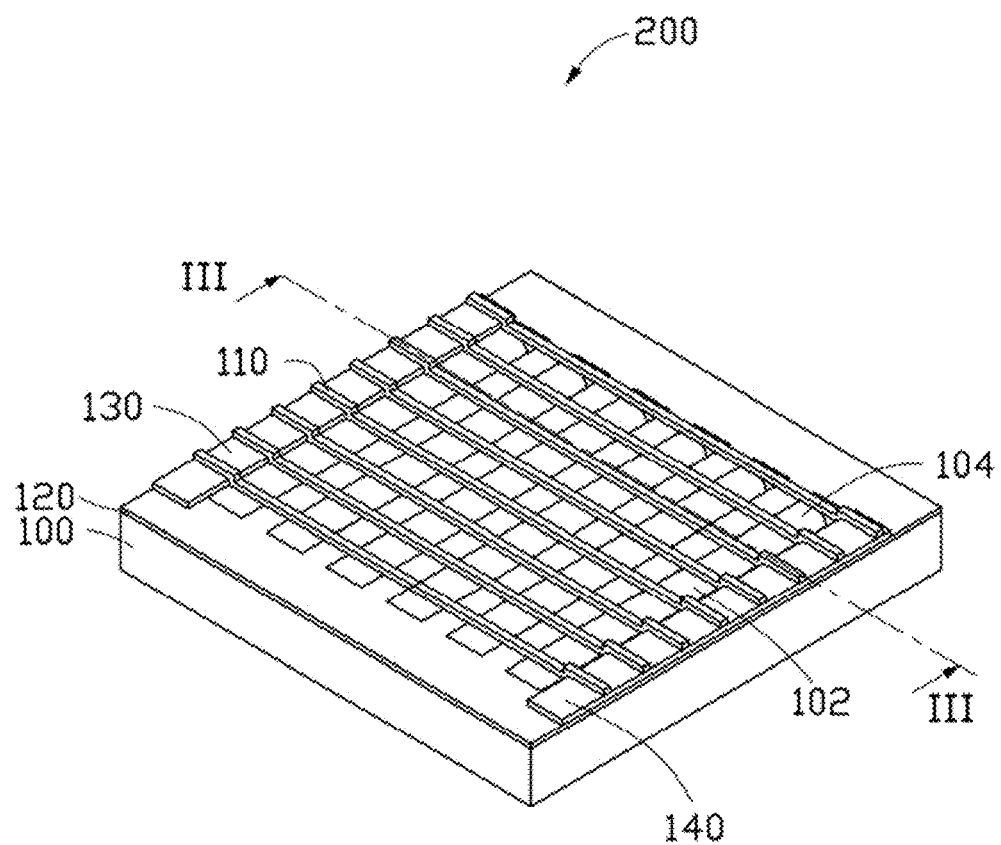
FIG. 2 is an exploded, isometric view of a thermoacoustic device unit of the thermoacoustic device array of FIG. 1.
Figure 3:
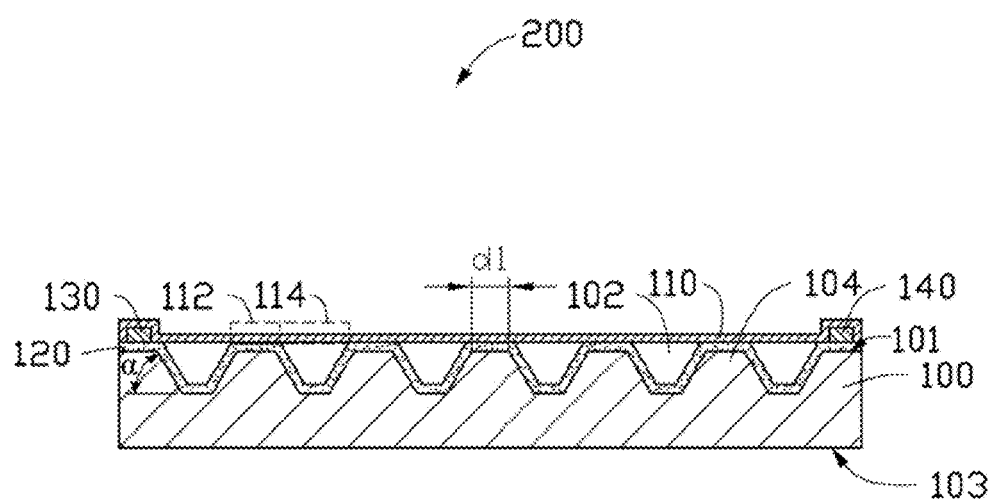
FIG. 3 is a transverse, cross-sectional view of the thermoacoustic device unit of FIG. 2 along line III-III.
Figure 4:
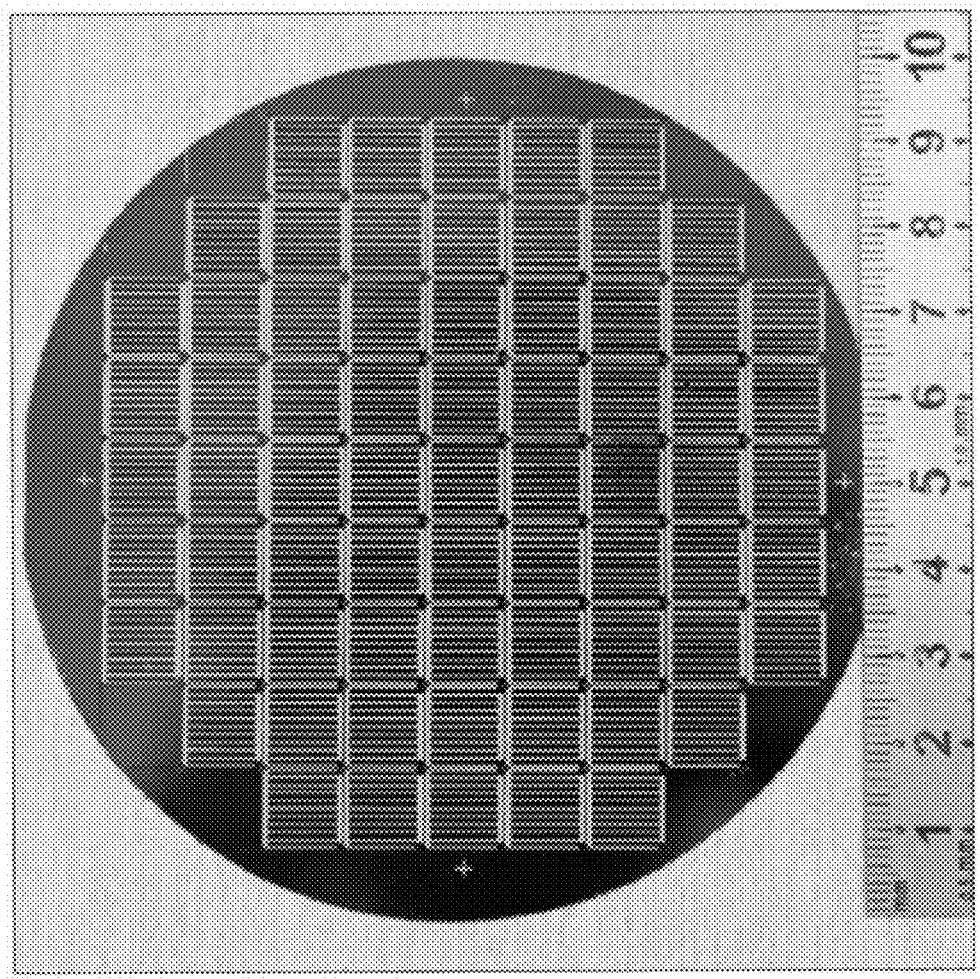
FIG. 4 is a photograph of the thermoacoustic device array of FIG. 1.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIGS. 1-4, a thermoacoustic device array 10 includes a substrate 100 and a plurality of thermoacoustic device units or cells 200. The substrate 100 includes a first surface 101. The plurality of thermoacoustic device units 200 is located on the first surface 101 of the substrate 100. Each of the plurality of thermoacoustic device units 200 includes a sound wave generator 110, a first electrode 130, and a second electrode 140. A plurality of recesses 102 is defined by the substrate 100. The plurality of recesses 102 are spaced from each other and located on the first surface 101 of the substrate 100. The sound wave generator 110 is attached on the first surface 101 and is suspended over the plurality of recesses 102. The first electrode 130 and the second electrode 140 are spaced from each other. At least one recess 102 is located between the first electrode 130 and the second electrode 140. The first electrode 130 and the second electrode 140 are electrically connected to the sound wave generator 110.

The substrate 100 is a flake-like structure. The shape of the substrate 100 can be circular, square, rectangular or other geometric figure. The resistance of the substrate 100 is greater than the resistance of the sound wave generator 110 to avoid a short through the substrate 100. The substrate 100 can have a good thermal insulating property, thereby preventing the substrate 100 from absorbing the heat generated by the sound wave generator 110. The material of the substrate 100 can be single crystal silicon or multicrystalline silicon. The size of the substrate 100 ranges from about 25 square millimeters to about 100 square millimeters. In one embodiment, the substrate 100 is single crystal silicon with a thickness of about 0.6 millimeters, and a length of each side of the substrate 100 is about 10 centimeters.

The plurality of thermoacoustic device units 200 is independent from each other. The term "independent from each other" means that the sound wave generators 110 of adjacent two thermoacoustic device units 200 are insulated from each other and work individually by the inputting different signals. Adjacent two thermoacoustic device units 200 are located independently by a plurality of cutting lines 105. The plurality of cutting lines 105 is located on the first surface 101 and defined by the substrate 100. The location of the plurality of cutting lines 105 is selected according to number of the thermoacoustic device units 200 and area of the substrate. In one embodiment, the plurality of cutting lines 105 are substantially parallel with or perpendicular to each other. The shape of the cutting line 105 can be a through hole, a blind recess (i.e., a depth of the cutting line 105 is less than a thickness of the substrate 100), a blind hole.

The plurality of the thermoacoustic device units 200 is dispersed on the surface 101 of the substrate 100 and arranged to form an array. The number of the thermoacoustic device units 200 is selected according to need. In one embodiment, the number of the thermoacoustic device units 200 is eight.

The plurality of recesses 102 can be uniformly dispersed on the first surface 101 such as dispersed in an array. The plurality of recesses 102 can also be randomly dispersed. In one embodiment, the plurality of recesses 102 extends along the same direction, and spaced from each other with a certain distance. The shape of the recess 102 can be a through hole, a blind recess (i.e., a depth of the recess 102 is less than a thickness of the substrate 100), or a blind hole. Each of the plurality of recesses 102 includes a bottom and a sidewall adjacent to the bottom. The first portion 112 is spaced from the bottom and the sidewall. A bulge 104 is formed between the adjacent two recesses 102.

A depth of the recess 102 can range from about 100 micrometers to about 200 micrometers. The sound waves reflected by the bottom surface of the blind recesses may have a superposition with the original sound waves, which may lead to an interference cancellation. To reduce this impact, the depth of the blind recesses that can be less than about 200 micrometers. In another aspect, when the depth of the blind recesses is less than 100 micrometers, the heat generated by the sound wave generator 110 would be dissipated insufficiently. To reduce this impact, the depth of the blind recesses and holes can be greater than 100 micrometers.

The plurality of recesses 102 can parallel with each other and extend along the same direction. A distance $d_1$ between adjacent two recesses 102 can range from about 20 micrometers to about 200 micrometers. Thus the first electrode 130 and the second electrode 140 can be printed on the substrate 100 via nano-imprinting method. A cross section of the recess 102 along the extending direction can be V-shaped, rectangular, or trapezoid. In one embodiment, a width of the recess 102 can range from about 0.2 millimeters to about 1 micrometer. Thus, sound wave generator 110 can be prevented from being broken. Furthermore, a driven voltage of the sound wave generator 110 can be reduced to lower than 12V. In one embodiment, the driven voltage of the sound wave generator 110 is lower than or equal to 5V. In one embodiment, the shape of the recess 102 is trapezoid. An angle α is defined between the sidewall and the bottom. The angle α is equal to the crystal plane angle of the substrate 100. In one embodiment, the width of the recess 102 is about 0.6 millimeters, the depth of the recess 102 is about 150 micrometers, the distance $d_1$ between adjacent two recesses 102 is about 100 micrometers, and the angle α is about 54.7 degrees.

The thermoacoustic device array 10 further includes an insulating layer 120. The insulating layer 120 can be a single-layer structure or a multi-layer structure. In one embodiment, the insulating layer 120 can be merely located on the plurality of bulges 104. In another embodiment, the insulating layer 120 is a continuous structure, and attached on the entire first surface 101. The insulating layer 120 covers the plurality of recesses 102 and the plurality of bulges 104. The sound wave generator 110 is insulated from the substrate 100 by the insulating layer 120. In one embodiment, the insulating layer 120 is a single-layer structure and covers the entire first surface 101.

The material of the insulating layer 120 can be $SiO_2$, $Si_3N_4$, or combination of them. The material of the insulating layer 120 can also be other insulating materials. A thickness of the insulating layer 120 can range from about 10 nanometers to about 2 micrometers, such as 50 nanometers, 90 nanometers, and 1 micrometer. In one embodiment, the thickness of the insulating layer is about 1.2 micrometers.

The sound wave generator 110 is located on the first surface 101 and insulated from the substrate 100 by the insulating layer 120. The sound wave generator 110 defines a first portion 112 and a second portion 114. The first portion 112 is suspended over the plurality of recesses 102, and the second portion 114 is attached on the plurality of bulges 104. The second portion 114 can be attached on the plurality of bulges 104 via an adhesive layer or adhesive particles (not shown).

The sound wave generator 110 has a very small heat capacity per unit area. The heat capacity per unit area of the sound wave generator 110 is less than $2 \times 10^{-4}$ $J/cm^2 * K$. The sound wave generator 110 can be a conductive structure with a small heat capacity per unit area and a small thickness. The sound wave generator 110 can have a large specific surface area for causing the pressure oscillation in the surrounding medium by the temperature waves generated by the sound wave generator 110. The sound wave generator 110 can be a free-standing structure. The term "free-standing" includes, but is not limited to, a structure that does not have to be supported by a substrate and can sustain the weight of it when it is hoisted by a portion thereof without any significant damage to its structural integrity. The suspended part of the sound wave generator 110 will have more sufficient contact with the surrounding medium (e.g., air) to have heat exchange with the surrounding medium from both sides of the sound wave generator 110. The sound wave generator 110 is a thermoacoustic film.

The sound wave generator 110 can be or include a free-standing carbon nanotube structure. The carbon nanotube structure may have a film structure. The thickness of the carbon nanotube structure may range from about 0.5 nanometers to about 1 millimeter. The carbon nanotubes in the carbon nanotube structure are combined by van der Waals attractive force therebetween. The carbon nanotube structure has a large specific surface area (e.g., above 30 $m^2/g$). The larger the specific surface area of the carbon nanotube structure, the smaller the heat capacity per unit area will be.

The smaller the heat capacity per unit area, the higher the sound pressure level of the sound produced by the sound wave generator 110.

The carbon nanotube structure can include at least one carbon nanotube film, a plurality of carbon nanotube wires, or a combination of carbon nanotube film and the plurality of carbon nanotube wires.

The carbon nanotube film can be a drawn carbon nanotube film formed by drawing a film from a carbon nanotube array that is capable of having a film drawn therefrom. The heat capacity per unit area of the drawn carbon nanotube film can be less than or equal to about $1.7 \times 10^{-6}$ J/cm$^2$*K. The drawn carbon nanotube film can have a large specific surface area (e.g., above 100 m$^2$/g). In one embodiment, the drawn carbon nanotube film has a specific surface area in the range from about 200 m$^2$/g to about 2600 m$^2$/g. In one embodiment, the drawn carbon nanotube film has a specific weight of about 0.05 g/m$^2$.

The thickness of the drawn carbon nanotube film can be in a range from about 0.5 nanometers to about 100 nanometers. When the thickness of the drawn carbon nanotube film is small enough (e.g., smaller than 10 micrometeras), the drawn carbon nanotube film is substantially transparent.

Figure 5:
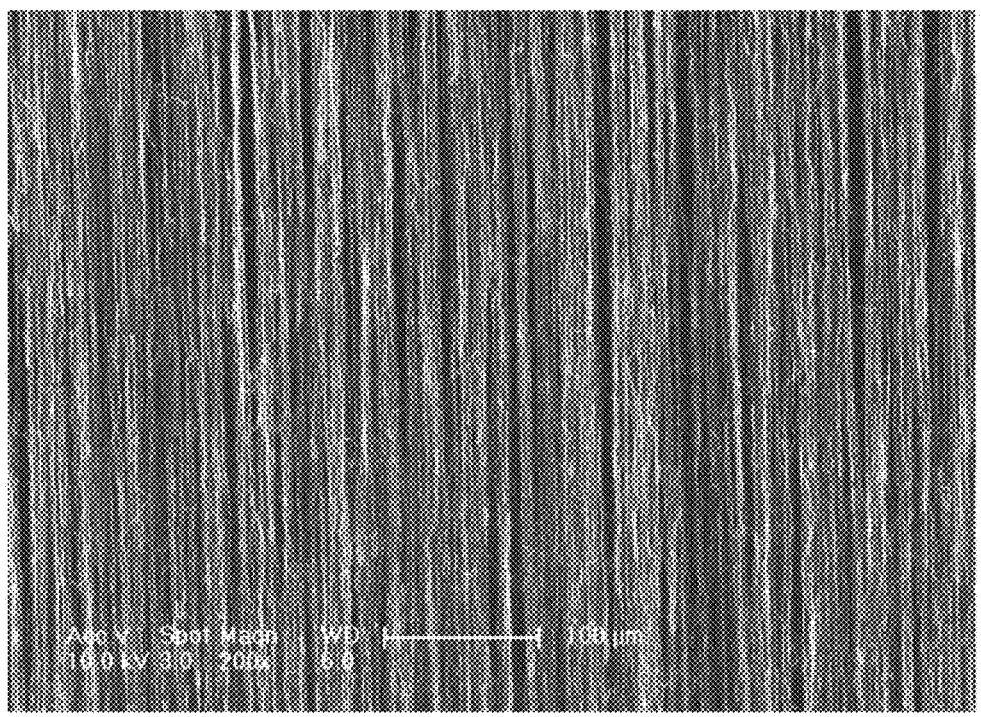
FIG. 5 shows a scanning electron microscope (SEM) image of a carbon nanotube film in the thermoacoustic device unit.

Referring to FIG. 5, the drawn carbon nanotube film includes a plurality of successive and oriented carbon nanotubes joined end-to-end by van der Waals attractive force therebetween. The carbon nanotubes in the drawn carbon nanotube film can be substantially oriented along a single direction and substantially parallel to the surface of the carbon nanotube film. Furthermore, an angle β can exist between the oriented direction of the carbon nanotubes in the drawn carbon nanotube film and the extending direction of the plurality of recesses 102, and 0<β≤90°. In one embodiment, the oriented direction of the plurality of carbon nanotubes is perpendicular to the extending direction of the plurality of recesses 102. As can be seen in FIG. 5, some variations can occur in the drawn carbon nanotube film. The drawn carbon nanotube film is a free-standing film. The drawn carbon nanotube film can be formed by drawing a film from a carbon nanotube array that is capable of having a carbon nanotube film drawn therefrom. Furthermore, the plurality of carbon nanotubes is substantially parallel with the first surface 101.

The carbon nanotube structure can include more than one carbon nanotube films. The carbon nanotube films in the carbon nanotube structure can be coplanar and/or stacked. Coplanar carbon nanotube films can also be stacked one upon other coplanar films. Additionally, an angle can exist between the orientation of carbon nanotubes in adjacent films, stacked and/or coplanar. Adjacent carbon nanotube films can be combined by only the van der Waals attractive force therebetween without the need of an additional adhesive. The number of the layers of the carbon nanotube films is not limited. However, as the stacked number of the carbon nanotube films increases, the specific surface area of the carbon nanotube structure will decrease. A large enough specific surface area (e.g., above 30 m$^2$/g) must be maintained to achieve an acceptable acoustic volume. An angle θ between the aligned directions of the carbon nanotubes in the adjacent two drawn carbon nanotube films can range from about 0 degrees to about 90 degrees. Spaces are defined between adjacent two carbon nanotubes in the drawn carbon nanotube film. When the angle θ between the aligned directions of the carbon nanotubes in adjacent drawn carbon nanotube films is larger than 0 degrees, a microporous structure is defined by the carbon nanotubes in the sound wave generator 110. The carbon nanotube structure in an embodiment employing these films will have a plurality of micropores. Stacking the carbon nanotube films will add to the structural integrity of the carbon nanotube structure.

The plurality of carbon nanotube wires are parallel with and spaced from each other. The plurality of carbon nanotube wires are intersected with the plurality of recesses 102. In one embodiment, the plurality of carbon nanotube wires is perpendicular to the plurality of recesses 102. Each of the plurality of carbon nanotube wires includes a plurality of carbon nanotubes, and the extending direction of the plurality of carbon nanotubes is parallel with the carbon nanotube wire. The plurality of carbon nanotube wires is suspended over the plurality of recesses 102.

A distance between adjacent two carbon nanotube wires ranges from about 1 micrometers to about 200 micrometers, such as 50 micrometers, 150 micrometers. In one embodiment, the distance between adjacent tow carbon nanotube wires is about 120 micrometers. A diameter of the carbon nanotube wire ranges from about 0.5 nanometers to about 100 micrometers. In one embodiment, the distance between adjacent two carbon nanotube wires is about 120 micrometers, and the diameter of the carbon nanotube wire is about 1 micrometer.

Figure 6:
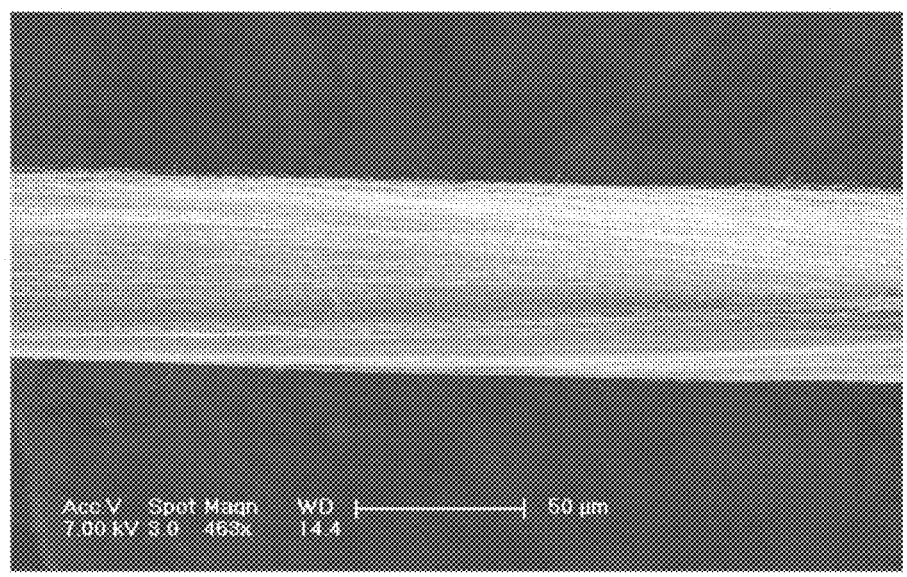
FIG. 6 shows an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 6, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 0.5 nanometers to about 100 micrometers.

Figure 7:
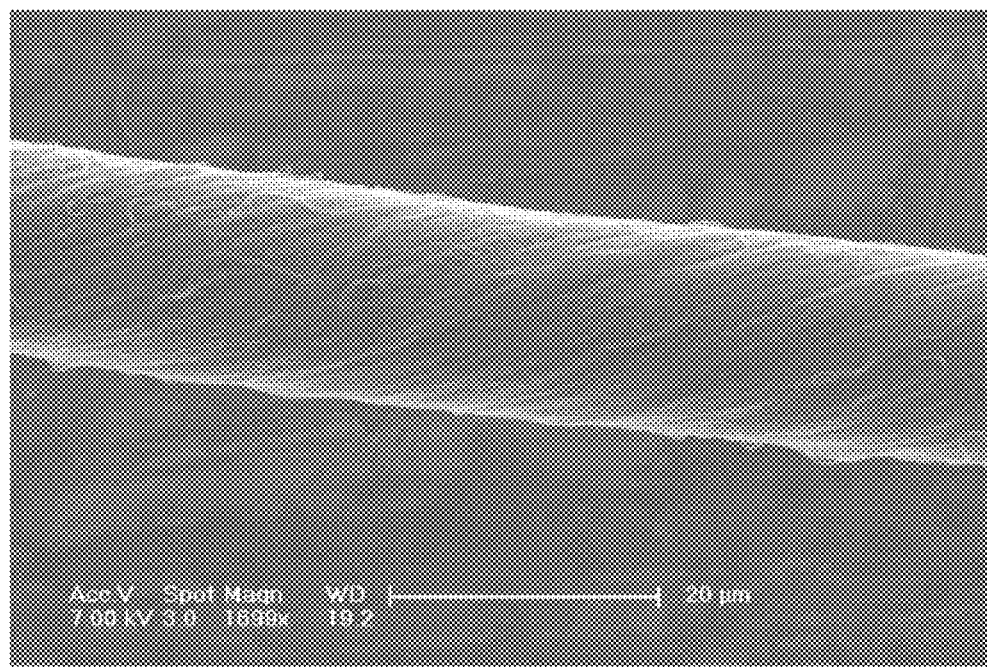
FIG. 7 shows an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 7, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes parallel to each other, and combined by van der Waals attractive force therebetween. Length of the carbon nanotube wire can be set as desired. A diameter of the twisted carbon nanotube wire can be from about 0.5 nm to about 100 μm. Further, the twisted carbon nanotube wire can be treated with a volatile organic solvent after being twisted. After being soaked by the organic solvent, the adjacent paralleled carbon nanotubes in the twisted carbon nanotube wire will bundle together, due to the surface tension of the organic solvent when the organic solvent volatilizing. The specific surface area of the twisted carbon nanotube wire will decrease, while the density and strength of the twisted carbon nanotube wire will be increased. The deformation of the sound wave generator 110 can be avoided during working, and the distortion degree of the sound wave can be reduced.

In some embodiments, the sound wave generator 110 is a single drawn carbon nanotube film drawn from the carbon nanotube array. The drawn carbon nanotube film has a thickness of about 50 nanometers, and has a transmittance of visible lights in a range from 67% to 95%.

In other embodiments, the sound wave generator 110 can be or include a free-standing carbon nanotube composite structure. The carbon nanotube composite structure can be formed by depositing at least a conductive layer on the outer surface of the individual carbon nanotubes in the above-described carbon nanotube structure. The carbon nanotubes can be individually coated or partially covered with conductive material. Thereby, the carbon nanotube composite structure can inherit the properties of the carbon nanotube structure such as the large specific surface area, the high transparency, the small heat capacity per unit area. Further, the conductivity of the carbon nanotube composite structure is greater than the pure carbon nanotube structure. Thereby, the driven voltage of the sound wave generator 110 using a coated carbon nanotube composite structure will be decreased. The conductive material can be placed on the carbon nanotubes by using a method of vacuum evaporation, spattering, chemical vapor deposition (CVD), electroplating, or electroless plating.

The first electrode 130 and the second electrode 140 are in electrical contact with the sound wave generator 110, and input electrical signals into the sound wave generator 110.

The first electrode 130 and the second electrode 140 are made of conductive material. The shape of the first electrode 130 or the second electrode 140 is not limited and can be lamellar, rod, wire, and block among other shapes. A material of the first electrode 130 or the second electrode 140 can be metals, conductive adhesives, carbon nanotubes, and indium tin oxides among other conductive materials. The first electrode 130 and the second electrode 140 can be metal wire or conductive material layers, such as metal layers formed by a sputtering method, or conductive paste layers formed by a method of screen-printing.

The first electrode 130 and the second electrode 140 can be electrically connected to two terminals of an electrical signal input device (such as a MP3 player) by a conductive wire. Thereby, electrical signals output from the electrical signal device can be input into the sound wave generator 110 through the first electrode 130 and the second electrode 140.

The plurality of thermoacoustic device units 200 is independent from each other. The work status of each thermoacoustic device unit 200 can be controlled separately and independently by inputting separate signals.

In one embodiment, a plurality of thermoacoustic device units 200 can be located on a second surface 103 of the substrate 100. The second surface 103 of the substrate 100 is opposite to the first surface 101. The plurality of thermoacoustic device units 200 on the first surface 101 and the second surface 103 are located with a one-to-one correspondence. The plurality of thermoacoustic device units 200 on the first surface 101 and the second surface 103 can work together by inputting the same signals or work individually by inputting different signals. When the plurality of thermoacoustic device units 200 on one surface fail to work, the plurality of thermoacoustic device units 200 on the other surface will still working. The thermoacoustic device array 10 has a long working lifespan.

Furthermore, a heat sink (not shown) can be located on the substrate 100, and the heat produced by the sound wave generator 110 can be transferred into the heat sink and the temperature of the sound wave generator 110 can be reduced.

The sound wave generator 110 is driven by electrical signals and converts the electrical signals into heat energy. The heat capacity per unit area of the carbon nanotube structure is extremely small, and thus, the temperature of the carbon nanotube structure can change rapidly. Thermal waves, which are propagated into surrounding medium, are obtained. Therefore, the surrounding medium, such as ambient air, can be heated at a frequency. The thermal waves produce pressure waves in the surrounding medium, resulting in sound wave generation. In this process, it is the thermal expansion and contraction of the medium in the vicinity of the sound wave generator 110 that produces sound. The operating principle of the sound wave generator 110 is the "optical-thermal-sound" conversion.

The thermoacoustic device array 10 has following advantages. First, the width of the recess 102 is equal to or greater than 0.2 millimeters and smaller than or equal to 1 millimeter, thus the carbon nanotube structure can be effectively protected from being broken. Second, the thermoacoustic device array 10 can be reworked; the plurality of the thermoacoustic device units 200 can be easily divided into individual thermoacoustic device units 200 by cutting the substrate 100 along the plurality of cutting lines 105.

Figure 8:
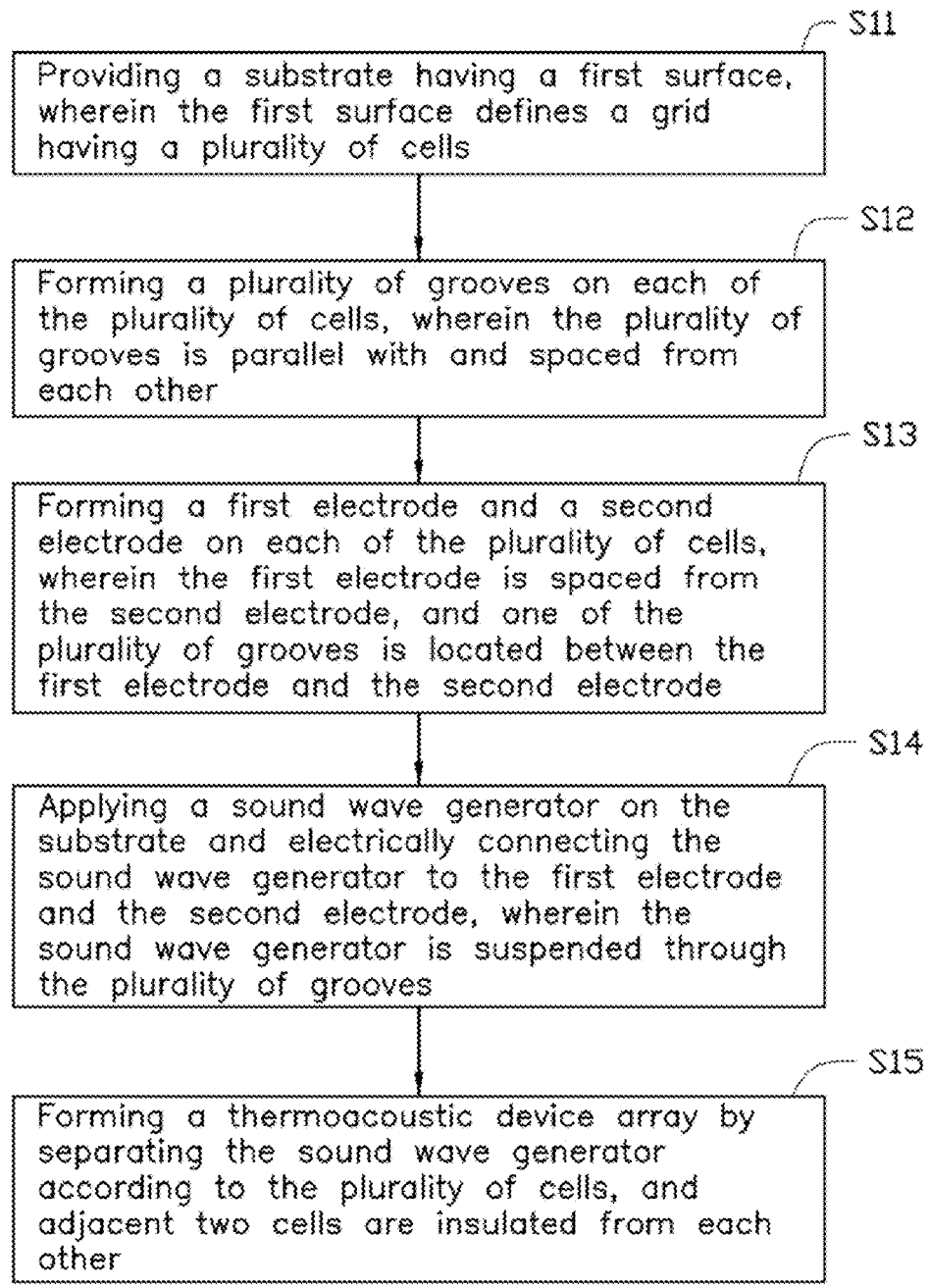
FIG. 8 is a flowchart of one embodiment of a method for making the thermoacoustic device array of FIG. 1.

Referring to FIG. 8, one embodiment of a method for making thermoacoustic device array 10 includes following steps:

(S11) providing a substrate 100 having a first surface 101, wherein the first surface 101 defines a grid having a plurality of cells;

(S12) forming a plurality of recesses 102 on each of the plurality of cells, wherein the plurality of recesses 102 are parallel with and spaced from each other;

(S13) forming a first electrode 130 and a second electrode 140 on each of the plurality of cells, wherein the first electrode 130 is spaced from the second electrode 140, and one of the plurality of recesses 102 is located between the first electrode 130 and the second electrode 140;

(S14) applying a sound wave generator 110 on the substrate 100 and electrically connecting the sound wave generator 110 to the first electrode 130 and the second electrode 140, wherein the sound wave generator 110 is suspended over the plurality of recesses 102; and (S15) forming a thermoacoustic device array 10 by separating the sound wave generator 110 according to the plurality of cells, and adjacent two cells are insulated from each other.

In step (S11), the grid can be defined by a plurality of cutting lines 105. The plurality of cutting lines 105 can be formed on the substrate 100 by etching method. The arrangement of the plurality of cutting lines 105 can be selected according to the shape of the thermoacoustic device array 10. In one embodiment, the plurality of cutting lines 105 are intersected with each other, and the substrate 100 is divided into a plurality of rectangular cells. The plurality of cutting lines 105 can be formed via a mechanical or chemical method, such as cutting, grinding, and etching. In one embodiment, the plurality of cutting lines 105 is formed by following substeps:

(S111) placing a patterned mask layer (not shown) on the substrate 100;

(S112) etching the substrate 100 to form the plurality of cutting lines 105 through the patterned mask layer; and (S113) removing the mask layer.

In step (S111), the mask layer defines a plurality of openings. The substrate 100 is exposed through the plurality of openings. The shape of the opening can be circular, square, or rectangular. The material of the mask layer can be selected according to the substrate 100, such as silicon dioxide, silicon nitride, silicon oxynitride, or titanium dioxide. The mask layer can protect one part of the substrate 100 which is sheltered by the mask layer from being corrupted by the solution. In one embodiment, the shape of the opening is rectangular, and a width of the opening ranges from about 0.2 millimeters to about 2 millimeter. A length of the opening is selected according to the shape and the size of the substrate 100. In one embodiment, the width of the substrate 100 is 0.15 millimeters and the length of the substrate 100 is 8 millimeters.

In step (S112), the substrate 100 can be etched by an etching solution. The etching solution can be an alkaline solution. In one embodiment, the etching solution is potassium hydroxide in a temperature about 80° C. During etching process, the plurality of cutting lines 105 is formed in the substrate 100.

Furthermore, because the material of the substrate 100 is silicon, thus the cross section of the cutting line 105 depends on the crystal plane angle silicon. In one embodiment, the cross section of the cutting line 105 is in a shape of trapezium.

In step (S113), the mask layer can be removed by dissolved in a solution. In one embodiment, the mask layer is removed by hydrofluoric acid.

In step (S12), the substrate 100 includes a first surface 101 and a second surface 103 opposite to the first surface 101. The plurality of recesses 102 are formed on the first surface 101, and a bulge 104 is formed between the adjacent two recesses 102. The plurality of recesses 102 is formed via dry etching or wet etching. In one embodiment, the plurality of recesses 102 is formed via wet etching. The plurality of recesses 102 is formed by the following substeps:

(S121) placing a patterned mask layer on the first surface 101 of the substrate 100;

(S122) etching each cell of the substrate 100 to form the plurality of recesses 102, wherein the plurality of recesses 102 are spaced from each other; and (S123) removing the mask layer.

Steps (S121) to (S123) are the same as steps (S111) to (S113). The mask layer defines a plurality of openings extending along the same direction, thus the plurality of recesses 102 is extending along the same direction. Recesses of adjacent two cells are disconnected. The depth of the plurality of recesses 102 ranges from about 100 micrometers to about 200 micrometers. The width of each of the plurality of recesses 102 ranges from about 0.2 millimeters to about 1 millimeter. The distance between adjacent two recesses 102 ranges from about 20 micrometers to about 200 micrometers.

Steps (S11) and (S12) can be preformed in one step. The plurality of cutting lines 105 and the plurality of the recesses 102 can be formed at the same time. Although the plurality of cutting lines 105 and the plurality of the recesses 102 are formed in the same process, the functions of the cutting lines 105 and the recesses 102 are different. The function of the plurality of cutting lines 105 is to define the plurality of cells and separate the plurality of the thermoacoustic device units 200. The function of the plurality of the recesses 102 is to allow the sound wave generator 110 to be suspended with enough distance to produce sound.

In step (S13), the first electrode 130 and the second electrode 140 are located apart from each other on two opposite sides of each of the plurality of cells of the substrate 100. In one embodiment, the first electrode 130 and the second electrode 140 are deposited on the bulge 104. The first electrode 130 and the second electrode 140 can be linear structure extending parallel with the plurality of bulges 104. In one embodiment, the first electrode 130 and the second electrode 140 are deposited on the bulges 104 via imprinting method.

In step (S14), the sound wave generator 110 can be located on the substrate 100 by following substeps:

(S141) providing a carbon nanotube film;

(S142) applying the carbon nanotube film on the first surface 101 of the subsrate 100, wherein the carbon nanotube film is suspended over the plurality of recesses 102.

In step (S141), the carbon nanotube film can be a drawn carbon nanotube film drawn from a carbon nanotube array. The drawn carbon nanotube film can be directly attached on the substrate 100. The drawn carbon nanotube film includes a plurality of carbon nanotubes substantially oriented along the same direction. The oriented direction of the plurality of carbon nanotubes is intersected with the extending direction of the plurality of recesses 102. In one embodiment, the oriented direction of the plurality of carbon nanotubes is perpendicular to the extending direction of the plurality of recesses 102.

In step (S142), the carbon nanotube film defines a first part and a second part. In one embodiment, the first part of the carbon nanotube film is suspended over the plurality of recesses 102, and the second part of the carbon nanotube film is attached on the first electrode 130 and the second electrode 140.

Furthermore, a fixed element (now shown) can be located on the sound wave generator 110 to fix the sound wave generator 110. The fixed element can be attached on the sound wave generator 110 by imprinting or coating method. In one embodiment, the fixed element is metallic fibers fixed on the sound wave generator 110 and the substrate 100.

In one embodiment, the first electrode 130 and the second electrode 140 can be applied after locating the carbon nanotube film on the insulating layer 120. The first electrode 130 and the second electrode 140 is attached on and electrically connected to the carbon nanotube film. The plurality of carbon nanotubes in the carbon nanotube film extends from the first electrode 130 to the second electrode 140. Furthermore, the carbon nanotube film can be firmly fixed on the substrate 100 by the first electrode 130 and the second electrode 140.

In step (S15), the method of separating the sound wave generator 110 is selected according to need. In one embodiment, a laser beam separates the carbon nanotube film. After being separated, the carbon nanotube film is further treated. The carbon nanotube film can be treated by following substeps:

(S151) forming a plurality of carbon nanotube belts by cutting the carbon nanotube film; and (S152) shrinking the plurality of carbon nanotube belts.

In step (S151), the carbon nanotube film can be cut with a laser device (not shown). The laser device emits a pulse laser beam. The laser device can be an argon ion laser or a carbon dioxide laser. The power of the laser device can range from about 1 watt to about 100 watts. In one embodiment, the laser device can have a power of approximately 12 watts.

The laser beam is irradiated on the carbon nanotube film, and a laser spot can be formed on the carbon nanotube film. The laser spot can be round in shape and have a diameter ranging from about 1 micrometer to about 5 millimeters (e.g. about 20 micrometers). It is noteworthy that the laser beam can be focused by a lens. It is also noteworthy that a number of laser devices can be adopted to adjust the shape of the laser spot. In one embodiment, the laser spot can have a strip shape having a width ranging from about 1 micrometer to about 5 millimeters.

The carbon nanotube film and the laser beam are controlled to move relative to each other so the laser spot moves relative to the carbon nanotube film. In one embodiment, the irradiated direction of the laser beam is substantially perpendicular to the carbon nanotube film. At the same time, the laser spot moves along a direction which perpendicular to oriented direction of the carbon nanotubes of the carbon nanotube film. The oriented direction of the carbon nanotubes of the carbon nanotube film is defined as direction X, thus the laser spot moves substantially parallel with the direction X.

In one embodiment, the carbon nanotube film can be fixed, and the laser device can be moved to irradiate selected portions of the carbon nanotube film along a scanning path. In another embodiment, the laser device can be fixed, and the carbon nanotube film can be moved relative to the laser beam so that the laser beam can irradiate some portions of the carbon nanotube film on the scanning path. In one embodiment, the carbon nanotube film and the laser device can be fixed, and the emergence angle of the laser beam can be adjusted to cause the laser beam moving relative to the carbon nanotube film, so the laser spot can be projected on the selected portions of the carbon nanotube film. The laser spot cuts the carbon nanotube film with a certain interval along the oriented direction of the carbon nanotubes. The distance can be substantially the same.

During the process of cutting the carbon nanotube film, a plurality of carbon nanotube belts is formed. The plurality of carbon nanotube belts are substantially parallel with each other. The plurality of carbon nanotube belts can have a substantially uniform width. The width of the carbon nanotube belt can range from about 10 micrometers to about 50 micrometers to avoid broken or fracture during shrinking the carbon nanotube belt. Microscopically, some two or more adjacent carbon nanotubes are still joined end to end in each carbon nanotube belt after the carbon nanotube film being cut. The carbon nanotubes are substantially parallel with each other.

Figure 9:
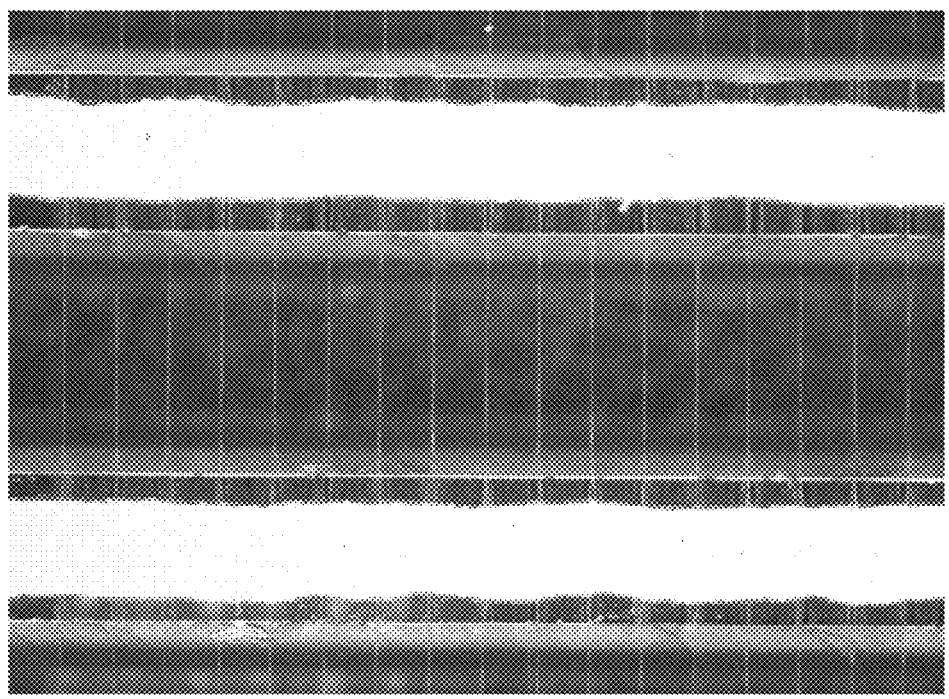
FIG. 9 shows a photomicrograph of a carbon nanotube wire soaked by an organic solution.

In step (S152), the plurality of carbon nanotube belts can be shrunk by dipping organic solvent. The plurality of carbon nanotube belts can also be immersed into the organic solvent. Referring to FIG. 9, the plurality of carbon nanotube belts is shrunk to form the plurality of carbon nanotube wires (the dark portion is the substrate 100, and the white portions are the first electrode 130 and the second electrode 140). The two opposite ends of the plurality of carbon nanotube wires are electrically connected to the first electrode 130 and the second electrode 140. The diameter of the carbon nanotube wires ranges from about 0.5 micrometers to about 3 micrometers. In one embodiment, the diameter of the carbon nanotube wire is about 1 micrometer, and the distance between adjacent two carbon nanotube wires is about 120 micrometers.

After treating the carbon nanotube film, the driven voltage between the first electrode 130 and the second electrode 140 can be reduced. Furthermore, during shrinking process, the organic solvent will not shrink a part of the plurality of carbon nanotube belts attached on the plurality of bulges 104. Thus after being shrunk, this part of the plurality of carbon nanotube wires can be firmly fixed on the bulges 104, and electrically connected to the first electrode 130 and the second electrode 140.

The method of making thermoacoustic device array 10 has following advantages. Because the first surface 101 of the substrate 100 defines the plurality of cells and the plurality of thermoacoustic device units 200 is formed in the plurality of cells at the same time, thus the productivity of the plurality of thermoacoustic device units 200 can be increased.

Figure 10:
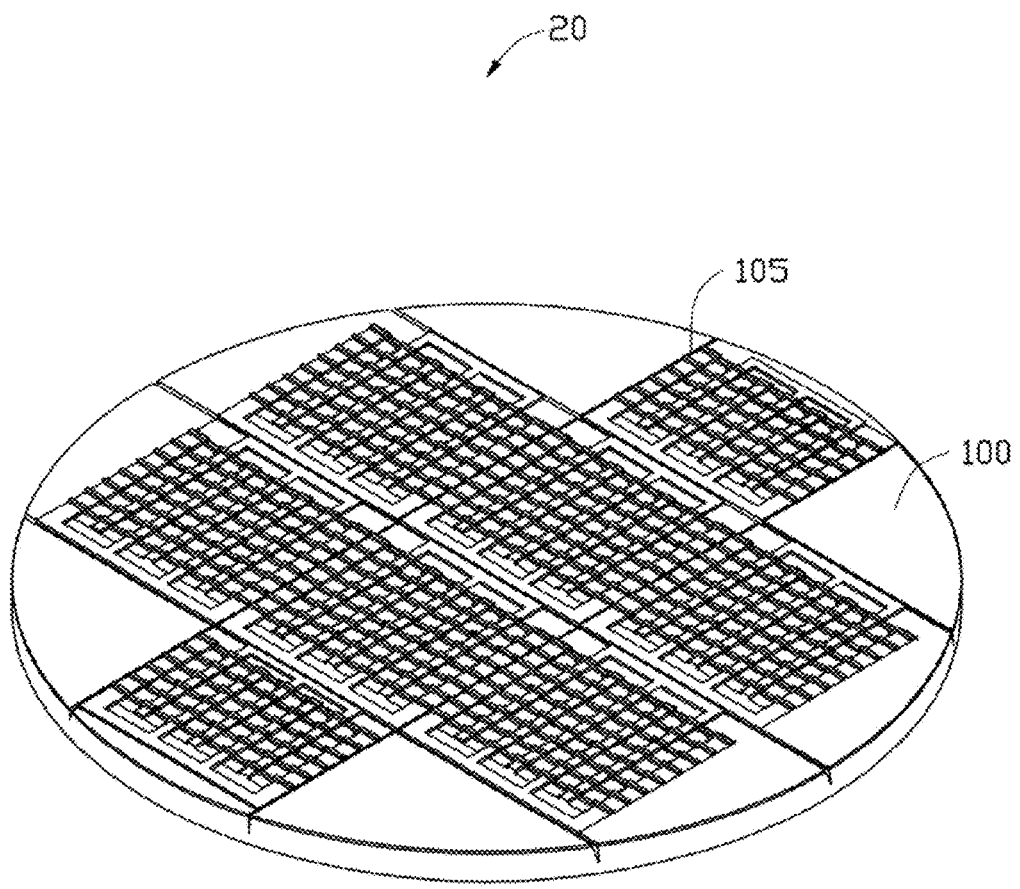
FIG. 10 is a schematic view of another embodiment of a thermoacoustic device array.
Figure 11:
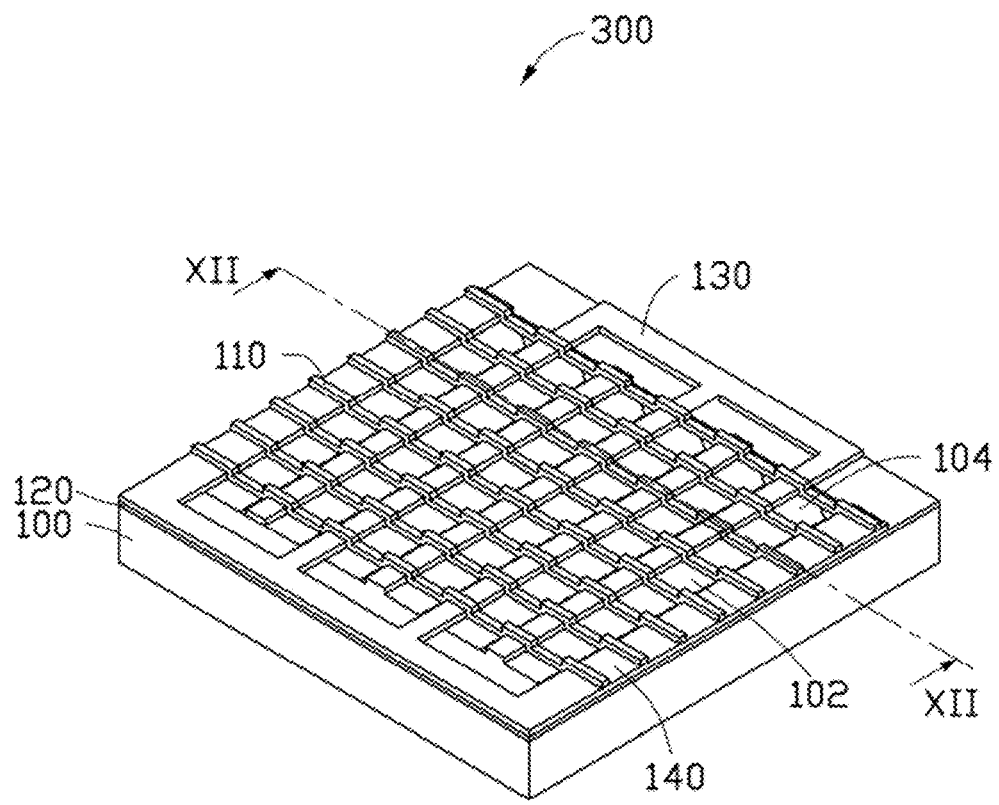
FIG. 11 is an exploded, isometric view of a thermoacoustic device unit of the thermoacoustic device array of FIG. 10.
Figure 12:
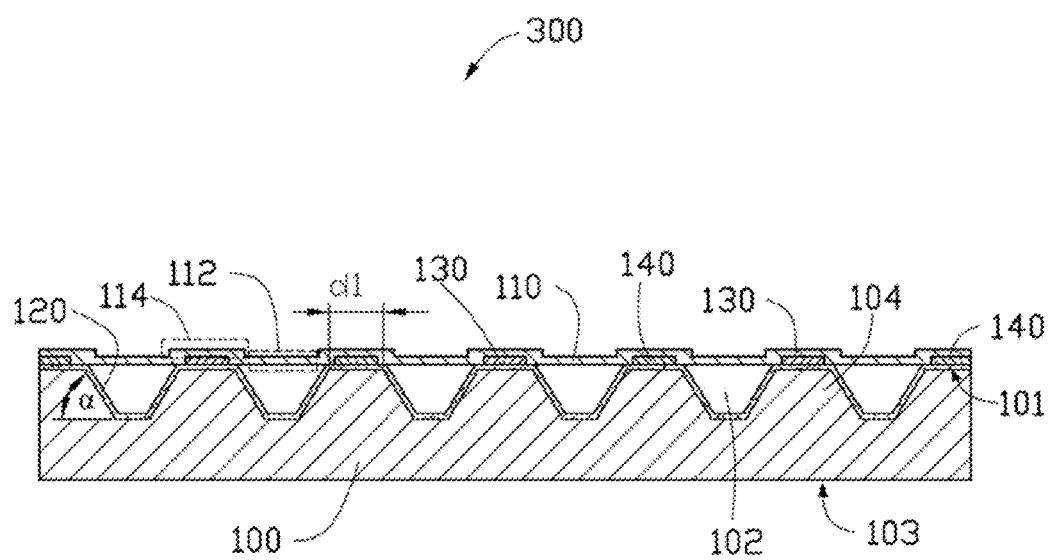
FIG. 12 is a transverse, cross-sectional view of the thermoacoustic device unit of FIG. 11.

Referring to FIGS. 10-12, one embodiment of a thermoacoustic device array 20 includes a substrate 100 and a plurality of thermoacoustic device units 300. The substrate 100 includes a first surface 101. The plurality of thermoacoustic device units 300 is located on the first surface 101 of the substrate 100. Each of the plurality of thermoacoustic device units 300 includes a sound wave generator 110, a plurality of first electrodes 130 and a plurality of second electrodes 140. A plurality of recesses 102 is defined by the substrate 100. The plurality of recesses 102 are spaced from each other and located on the first surface 101 of the substrate 100. The sound wave generator 110 is attached on the first surface 101 and is suspended over the plurality of recesses 102. Each of the plurality of first electrodes 130 and each of the plurality of second electrodes 140 are spaced from each other. At least one recess 102 is located between each of the plurality of first electrodes 130 and each of the plurality of second electrodes 140. Each of the plurality of first electrodes 130 and each of the plurality of second electrodes 140 are electrically connected to the sound wave generator 110.

The structure of the thermoacoustic device array 20 is similar to that of the thermoacoustic device array 10, except that the thermoacoustic device array 20 includes the plurality of first electrodes 130 and the plurality of second electrodes 140.

The plurality of first electrodes 130 and the plurality of second electrodes 140 can be arranged as a staggered manner of "a-b-a-b-a-b . . . ". All the plurality of first electrodes 130 is electrically connected together and all the plurality of second electrodes 140 is electrically connected together, whereby the sections of the sound wave generator 110 between the adjacent first electrode 130 and the second electrode 140 are in parallel. An electrical signal is conducted in the sound wave generator 110 from the plurality of first electrodes 130 to the plurality of second electrodes 140. By placing the sections in parallel, the resistance of the thermoacoustic device unit is decreased. Therefore, the driving voltage of the thermoacoustic device unit can be decreased with the same effect.

The plurality of first electrodes 130 and the plurality of second electrodes 140 can be substantially parallel to each other with a same distance between the adjacent first electrode 130 and the second electrode 140. The plurality of first electrodes 130 and the plurality of second electrodes 140 are alternatively located on the plurality of bulges 104. The sound wave generator 110 between adjacent first electrodes 130 and the second electrodes 140 is suspended over the plurality of recesses 102.

To connect all the plurality of first electrodes 130 together, and connect all the plurality of second electrodes 140 together, first conducting member and second conducting member can be arranged. All the plurality of first electrodes 130 are connected to the first conducting member. All the plurality of second electrodes 140 are connected to the second conducting member. The sound wave generator 110 is divided by the plurality of first electrodes 130 and the plurality of second electrodes 140 into many sections. The sections of the sound wave generator 110 between the adjacent first electrode 130 and the second electrode 140 are in parallel. An electrical signal is conducted in the sound wave generator 110 from the plurality of first electrodes 130 to the plurality of second electrodes 140.

The first conducting member and the second conducting member can be made of the same material as the plurality of first electrodes 130 and the plurality of second electrodes 140, and can be perpendicular to the plurality of first electrodes 130 and the plurality of second electrodes 140.

Figure 13:
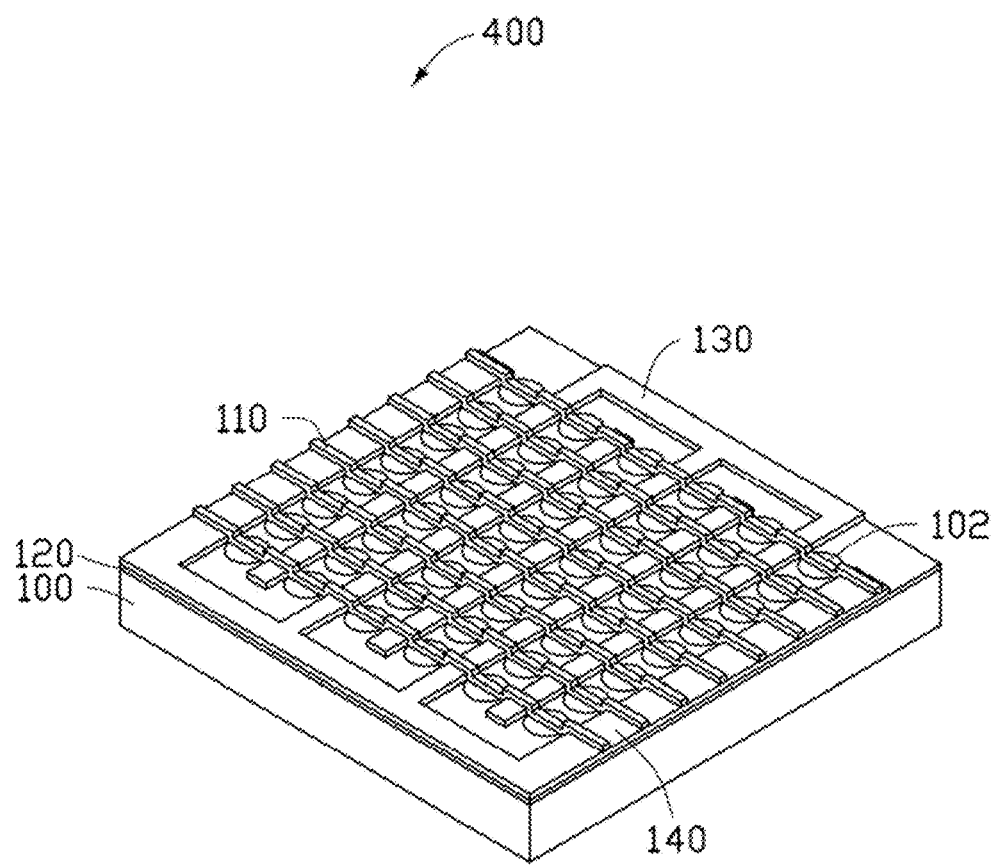
FIG. 13 is an exploded, isometric view of another embodiment of a thermoacoustic device unit of the thermoacoustic device array.

Referring to FIG. 13, one embodiment of a thermoacoustic device array 30 includes a substrate 100 and a plurality of thermoacoustic device units 400. The substrate 100 includes a first surface 101. The plurality of thermoacoustic device units 400 is located on the first surface 101 of the substrate 100. Each of the plurality of thermoacoustic device units 400 includes a sound wave generator 110, a plurality of first electrodes 130 and a plurality of second electrodes 140. A plurality of holes 106 is defined by the substrate 100. The plurality of holes 106 are spaced from each other and located on the first surface 101 of the substrate 100 uniformly. The sound wave generator 110 is attached on the first surface 101 and is suspended over the plurality of holes 106. Each of the plurality of first electrodes 130 and each of the plurality of second electrodes 140 are spaced from each other. At least one hole 106 is located between each of the plurality of first electrodes 130 and each of the plurality of second electrodes 140. Each of the plurality of first electrodes 130 and each of the plurality of second electrodes 140 are electrically connected to the sound wave generator 110.

The structure of the thermoacoustic device array 30 is similar to that of the thermoacoustic device array 20 except that the thermoacoustic device array 30 includes the plurality of holes 106, and the sound wave generator 110 is suspended over the plurality of holes 106.

Each of the plurality of holes 106 has a circular or ellipse opening on the first surface. The plurality of holes 106 are arranged in an array or stagger structure. The depth of each of the plurality of holes 106 ranges from about 100 micrometers to about 200 micrometers. The width of the opening of each of the plurality of holes 106 ranges from about 0.2 millimeters to about 1 millimeter. In one embodiment, the plurality of holes 106 are arranged in an array, the opening of each of the plurality of holes 106 is circular, and the diameter of each of the plurality of holes 106 is about 0.6 millimeters.

Figure 14:
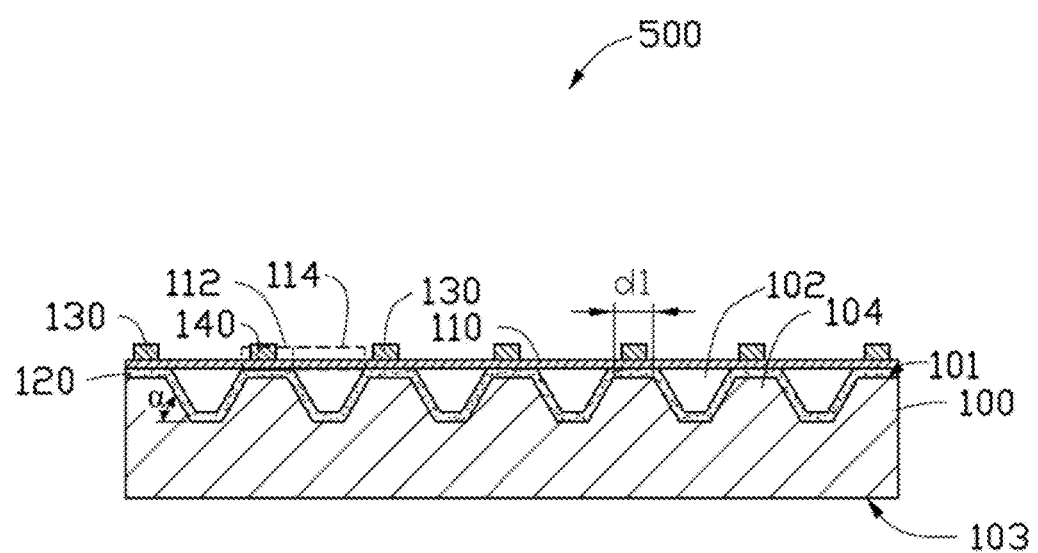
FIG. 14 is a transverse, cross-sectional view of another embodiment of a thermoacoustic device unit of the thermoacoustic device array.

Referring to FIG. 14, one embodiment of a thermoacoustic device array 40 includes a substrate 100 and a plurality of thermoacoustic device units 500. The substrate 100 includes a first surface 101. The plurality of thermoacoustic device units 500 are located on the first surface 101 of the substrate 100. Each of the plurality of thermoacoustic device units 500 includes a sound wave generator 110, a plurality of first electrodes 130 and a plurality of second electrodes 140. A plurality of recesses 102 is defined by the substrate 100. The plurality of recesses 102 are spaced from each other and located on the first surface 101 of the substrate 100. The sound wave generator 110 is attached on the first surface 101 and is suspended over the plurality of recesses 102. Each of the plurality of first electrodes 130 and each of the plurality of second electrodes 140 are spaced from each other. At least one recess 102 is located between each of the plurality of first electrodes 130 and each of the plurality of second electrodes 140. Each of the plurality of first electrodes 130 and each of the plurality of second electrodes 140 are electrically connected to the sound wave generator 110.

The structure of the thermoacoustic device array 40 can be similar to that of the thermoacoustic device array 20, except that the sound wave generator 110 is located between the substrate 100 and the plurality of first electrodes 130 or the plurality of second electrodes 140. The sound wave generator 110 is fixed by the plurality of first electrodes 130 and the plurality of second electrodes 140.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the invention. Variations may be made to the embodiments without departing from the spirit of the invention as claimed. Any elements discussed with any embodiment are envisioned to be able to be used with the other embodiments. The above-described embodiments illustrate the scope of the invention but do not restrict the scope of the invention.

What is claimed is:

1. A method for making a thermoacoustic device array, the method comprising:
   providing a substrate having a surface, wherein the surface defines a grid having a plurality of cells;
   forming a plurality of recesses on each of the plurality of cells, wherein the plurality of recesses are parallel with and spaced from each other;
   forming a first electrode and a second electrode on each of the plurality of cells, wherein the first electrode is spaced from the second electrode, and one of the plurality of recesses is located between the first electrode and the second electrode;
   applying a sound wave generator on the substrate and electrically connecting the sound wave generator to the first electrode and the second electrode, wherein the sound wave generator is suspended over the plurality of recesses; and the applying the sound wave generator on the substrate comprises placing a carbon nanotube film on the substrate, and the carbon nanotube film comprises a plurality of carbon nanotubes substantially oriented along a first direction and parallel with the surface of the substrate;
   cutting the carbon nanotube film to form a plurality of carbon nanotube film cells, with each of the plurality of carbon nanotube film cells in one of the plurality of cells; and
   treating the plurality of carbon nanotube film cells after the cutting the carbon nanotube film.

2. The method of claim 1, wherein the providing the substrate comprises forming a plurality rows of cutting lines and a plurality columns of cutting lines on the surface.

3. The method of claim 2, wherein the forming the plurality rows of cutting lines and the plurality columns of cutting lines comprises etching the surface.

4. The method of claim 2, wherein forming the plurality of recesses comprises following substeps:
   locating a mask layer on the surface of the substrate;
   etching the substrate in each of the plurality of cells with an etching solution; and
   removing the mask layer.

5. The method of claim 2, wherein the separating the sound wave generator comprises cutting the sound wave generator along the plurality rows of cutting lines and the plurality columns of cutting lines.

6. The method of claim 1, wherein a width of each of the plurality of recesses ranges from about 0.2 millimeters to about 1 millimeter, a depth of each of the plurality of recesses ranges from about 100 micrometers to about 200 micrometers, and a distance between adjacent two recesses ranges from about 20 micrometers to about 200 micrometers.

7. The method of claim 1, further coating an insulating layer on the surface before the forming the first electrode and the second electrode.

8. The method of claim 1, wherein the substrate comprises a single crystal silicon or a multicrystalline silicon.

9. The method of claim 1, wherein an angel is formed between the first direction and an extending direction of the plurality of recesses, and the angel is larger than 0degrees and smaller than or equal to 90 degrees.

10. The method of claim 1, wherein the sound wave generator comprises a plurality of carbon nanotube films.

11. The method of claim 1, further comprising treating the plurality of carbon nanotube film cells, wherein the treating the plurality of carbon nanotube film cells comprises:
    forming a plurality of carbon nanotube belts spaced from each other by cutting each of the plurality of carbon nanotube film cells; and
    shrinking the plurality of carbon nanotube belts with organic solution.

12. The method of claim 1, wherein each of the plurality of recesses is a through recess or a blind recess.

13. The method of claim 1, further comprising forming a plurality of third electrodes and a plurality of fourth electrodes on each of the plurality of cells, the plurality of third electrodes and the plurality of fourth electrodes are alternatively on the surface, the plurality of third electrodes is electrically connected, and the plurality of fourth electrodes is electrically connected.

14. The method of claim 1, wherein the forming the first electrode and the second electrode is performed after the applying the sound wave generator on the substrate.

* * * * *